United States Patent Office 3,726,853
Patented Apr. 10, 1973

3,726,853
BENZANRIDO-AZO - 2 - HYDROXY-3-(CARBOX-ANILIDO-AZO-PHENYL)-NAPHTHALENE COMPOUNDS
Emil Stocker, Riehen, Georg Anton Klein, Bottmingen, Basel-Land, and Ernfred Schnabel, Reinach, Basel-Land, Switzerland, assignors to Ciba-Geigy AG, Basel, Switzerland
No Drawing. Filed July 14, 1970, Ser. No. 54,857
Claims priority, application Switzerland, July 16, 1969, 10,831/69
Int. Cl. C09b 31/06
U.S. Cl. 260—188           11 Claims

ABSTRACT OF THE DISCLOSURE

Disazo compounds of the formula

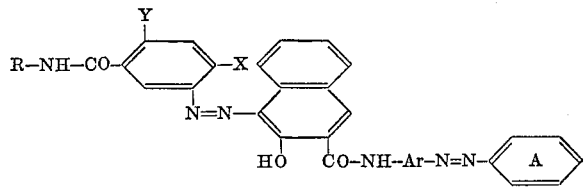

wherein R represents an alkyl, phenyl or naphthyl radical, X halogen, methyl or phenoxy and Ar a phenylene or naphthylene radical are valuable pigments for coloring plastics in red shades.

DESCRIPTION OF THE INVENTION

The present invention relates to new disazo compounds, to their use for the pigmenting of high-molecular organic material, and to the compositions thereof.

It has been found that compounds of Formula I

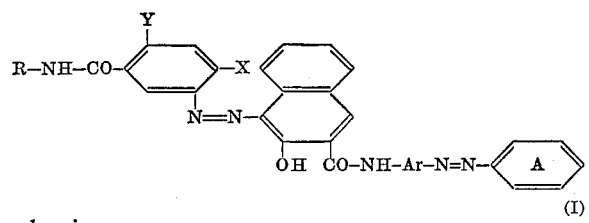

wherein

R represents an aryl group or an alkyl group,
X represents chlorine, bromine, the methyl group, the phenoxy group, or the phenoxy group substituted by 1 to 3 chlorine atoms, or by 1 to 2 methyl groups,
Y represents hydrogen, or also chlorine if X is chlorine, and
Ar represents an arylene group, and the benzene nucleus A can also be non-ionically substituted, are valuable pigments.

Especially valuable are pigments of Formula I wherein R represents a phenyl radical optionally substituted by 1 to 3 chlorine atoms or the methyl group Ar represents the 1,4-phenylene group optionally substituted by a chlorine atom, and A is optionally substituted by a chlorine atom.

Compared to known pigments of similar structure, the new disazo pigments are distinguished by their purity and intensity, by better fastness to migration in polyvinyl chloride, as well as by a good fastness to light, to cross-lacquering, to weather and to heat.

For example, in Formula I, Ar represents an unsubstituted or a non-ionically substituted 1,4-phenylene group or 1,4-naphthylene group. If the benzene nucleus A is substituted, then suitable substituents are in particular, chlorine alkyl groups having 1 to 4 carbon atoms or alkoxy groups having 1 to 4 carbon atoms such as the methyl group or the methoxy or ethoxy group, also trifluoromethyl groups or nitro groups. If R denotes an alkyl group, then this is preferably a lower alkyl group having e.g. 1–4 carbon atoms, especially the methyl group. Suitable aryl groups are phenyl or naphthyl, which can be substituted, such as, e.g. by halogen, methyl, methoxy, trifluoromethyl, methoxycarbonyl, or acylamino groups.

The pigments of Formula I according to the invention can be produced by coupling the diazonium compound of an amine of Formula II

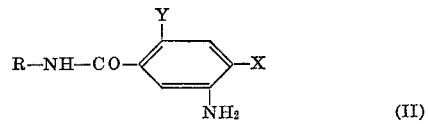

with a compound of Formula III

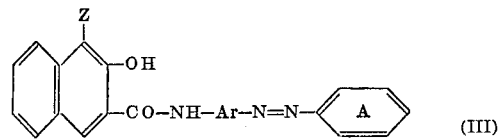

wherein Z=H or —CH₂—W, whereby W stands for the radical of a primary or secondary amine; or by coupling the diazonium compound of an amine of Formula IV

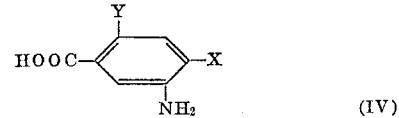

with a compound of Formula III, and subsequently condensing it with a compound of Formula V

or by condensing a compound of Formula VI

with a compound obtained by the coupling of a diazonium compound of an amine of Formula II with a coupling component of Formula VII

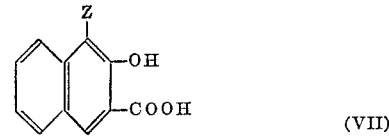

In the case of the compounds of Formulae III and VII, in so far as Z represents the —CH₂—W-group, these are so-called Mannich bases (cp., e.g. the German patent specification 1,257,312).

The coupling is advantageously performed in an aqueous, preferably acid solution, and at elevated temperature, optionally in the presence of an inert solvent or dispersing agent. Suitable solvents are water-miscible solvents such as lower alcohols, e.g. methanol, ethanol, ethylene glycol monomethyl ether or ethylene glycol monoethyl ether, lower ketones, e.g. acetone, and tertiary nitrogen bases, e.g. pyridine, and also dimethylformamide, also certain non-water-miscible solvents such as, optionally, halogenated or nitrated hydrocarbons, e.g. toluene, chlorobenzene and nitrobenzene. Suitable dispersing agents are, e.g. addition products of alkylene oxide, especially ethylene oxide, with fatty alcohols or fatty acids, or condensation products of naphthalene sulphonic acids with formaldehyde.

The pigment produced according to the invention is isolated, washed, dried and pulverised. It can be used direct for pigmenting; but preferably it is firstly purified by means of an aftertreatment in an organic solvent at elevated temperature.

Preferred pigments are those of Formula I wherein Ar represents the 1,4-phenylene group or the 1,4-naphthylene group, and R denotes a benzene radical or naphthylene radical optionally non-ionically substituted, particularly a benzene radical substituted by 1 to 3 chlorine atoms and/or 1 to 2 methyl groups, by trifluoromethyl groups and/or methoxy groups and/or by a methoxycarbonyl group and/or an acylamino group. Of these, such compounds are especially preferred wherein X stands for chlorine, particularly compounds with R denoting a phenyl group substituted by 1 to 3 chlorine atoms, preferably in the 2,4,5-position, and Y denoting hydrogen.

The disazo compounds according to the invention are suitable for the pigmenting of high-molecular organic materials, e.g. in printing inks for the printing trade, in lacquers having an oily base, such as in linseed-oil paints, or having an aqueous base, such as in dispersion paints, in lacquers of various types such as, e.g. in nitro lacquers or in stoving-enamels, particularly, however, for the pigmenting of synthetic materials such as polyolefins, e.g. polypropylene, and preferably polyvinyl chloride, also for the pigmenting of synthetic fibres such as polyester, polyacrylonitrile and polyolefin fibres. They impart to these materials beautiful and full red dyeings in various shades or—with the simultaneous addition of white pigments such as titanium oxide—corresponding pastel dyeings. The dyeings have good fastness to migration, heat, weather and light; the lacquers are distinguished by a good fastness to cross-lacquering.

The temperatures are given in degrees centigrade in the following examples.

EXAMPLE 1

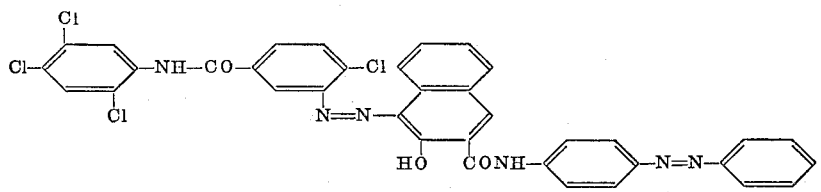

3.50 g. (1/100 mole) of 4-chloro-3-aminobenzoic acid-2',4',5'-trichloroanilide are dissolved, with stirring, in 400 ml. of glacial acetic acid at 45°, whereupon 12.0 ml. of 10 N hydrochloric acid are also added. A solution of 0.76 g. of sodium nitrite and 0.5 g. of alkylpolyglycol ether in 200 ml. of water is then plunged into the acetic acid solution, the mixture immediately heated to 55°, and 60 ml. of 2 N sodium acetate solution are then added. A solution, produced at 20°, of 3.80 g. of 2',3'-hydroxynaphthoyl-4-aminoazobenzene in 100 ml. of methanol, and 50 ml. of 2 N sodium hydroxide solution is thereupon added in 4 minutes at 50–55° to the diazonium compound. When the coupling is completed, the formed red pigment is filtered off, washed with water, and dried at 70°.

After being ground, the pigment is used direct for the pigmenting of high-molecular organic material; or it is further purified by means of a subsequent heat treatment in an organic solvent, e.g. by being heated for 20 minutes, with stirring, in 150 ml. of o-dichlorobenzene to 132–135°; being then allowed to cool to 50°, filtered off, washed with methanol, and dried. In lacquers it exhibits a red shade, has fastness to cross-lacquering and to heat, and has very good fastness to light. In soft polyvinyl chloride it is likewise distinguished by purity of shade and strength of colour, and by a very food fastness to migration and heat, and by excellent fastness to light.

EXAMPLE 2

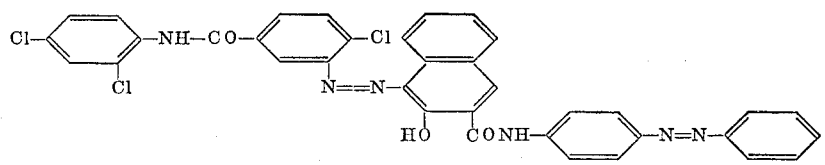

Into 40 ml. of sulphuric acid/nitrosyl sulphuric acid mixture containing 2.55 g. of HO₃SO—NO are added, with stirring, 6.31 g. of ground 4-chloro-3-aminobenzoic acid-2',4'-dichloroanilide. After 30 minutes, the obtained solution is poured, in a thin stream, into a stirred mixture of 100 ml. of ice water and 100 g. of crushed ice; and the obtained suspension of the diazonium salt is stirred for a further 15 minutes at about 30°. To this is then added dropwise, in 5 minutes, a solution of 7.34 g. of 2',3'-hydroxynaphthoyl-4-aminoazobenzene in 60 ml. of methanol and 26.6 g. of 30% sodium hydroxide solution, whereby the temperature rises to about 40°. The red pigment-suspension is subsequently heated in 30 minutes to 82°; this temperature is maintained for a further 30 minutes, and the pigment then filtered off hot; it is washed with water until neutral, and dried at 70°.

An amount of 10.0 g. of ground crude pigment is added, with stirring, to 150 ml. of o-dichlorobenzene; it is then heated during 2 hours to 140–142°, filtered off at 100°, washed with methanol, and dried at 70°. A yellowish red pigment is obtained which is used, e.g. for the pigmenting of polyvinyl chloride, and which enables brilliant scarlet shades having excellent fastness to migration, to heat and to light, to be produced.

By proceeding as in Example 1 but using, instead of the 4-chloro-3-aminobenzoic acid-2',4',5'-trichloroanilide used there, equimolecular amounts of the amines listed in the following table, pigments are obtained having properties similar to those of the pigment of Example 1 or 2, with the shades given in the 3rd column of the table.

TABLE

| Ex. | Amine | Shade |
|---|---|---|
| 3 | 2,5-dichloro-phenyl-NH-CO-(4-Cl, 3-NH₂-phenyl) | Red. |
| 4 | 3,4-dichloro-phenyl-NH-CO-(3-Cl, 4-NH₂-phenyl) | Red. |
| 5 | 2,4,5-trichloro-phenyl-NH-CO-(3-Cl, 4-NH₂-phenyl) | Yellowish red. |
| 6 | 4,5-dichloro-2-methoxy-phenyl-NH-CO-(3-Cl, 4-NH₂-phenyl) | Red. |
| 7 | 4-methoxy-2,5-dichloro-phenyl-NH-CO-(4-Cl, 3-NH₂-phenyl) | Red. |
| 8 | 4-methoxy-5-chloro-2-methoxy-phenyl-NH-CO-(3-Cl, 4-NH₂-phenyl) | Red. |
| 9 | 4-chloro-2-methyl-phenyl-NH-CO-(3-Cl, 4-NH₂-phenyl) | Red. |
| 10 | H₃C-O-CO-(phenyl)-NH-CO-(4-Cl, 3-NH₂-phenyl) | Yellowish-red. |
| 11 | H₃C-O-CO-(4-Cl-phenyl)-NH-CO-(3-Cl, 4-NH₂-phenyl) | Red. |
| 12 | H₃COOC-(2,4-dichloro-phenyl)-NH-CO-(3-Cl, 4-NH₂-phenyl) | Yellowish-red. |
| 13 | H₃C-CO-NH-(phenyl)-NH-CO-(3-Cl, 4-NH₂-phenyl) | Red. |
| 14 | H₃C-CO-NH-(4-methoxy-phenyl)-NH-CO-(3-Cl, 4-NH₂-phenyl) | Red. |
| 15 | 2,4-dichloro-phenyl-CO-NH-(2,5-dimethoxy-phenyl)-NH-CO-(3-Cl, 4-NH₂-phenyl) | Yellowish-red. |
| 16 | H₃C-NH-CO-(2,5-dichloro-4-NH₂-phenyl) | Red. |
| 17 | phenyl-NH-CO-(2,5-dichloro-4-NH₂-phenyl) | Red. |

TABLE—Continued

| Ex. | Amine | Shade |
|---|---|---|
| 18 | (Cl, Cl)-C6H2-NH-CO-C6H3(Cl)(NH2)(Cl) | Red. |
| 19 | Cl-C6H3(CH3)-NH-CO-C6H3(Cl)(NH2)(Cl) | Red. |
| 20 | (Cl, Cl)-C6H2(Cl)-NH-CO-C6H3(Cl)(CH3)(NH2) | Red. |
| 21 | (Cl, Cl)-C6H2(Cl)-NH-CO-C6H3(NH2)-O-C6H4-Cl | Bluish-red. |
| 22 | (F3C, F3C)-C6H3-NH-CO-C6H3(Cl)(NH2) | Red. |

The amine of Example 21 can be produced, e.g. as follows:

3-nitro-4-chlorobenzoic acid is reacted with p-chlorophenol; the acid chloride is produced, and this is condensed with 2,4,5-trichloroaniline, whereupon, in the formed compound, the nitro group is reduced to the amino group.

With the same procedure as given in Example 1, but using equivalent amounts of the following diazo and coupling components, pigments are obtained having similar properties and with the shades shown in the last column.

EXAMPLE 28

To a base mixture consisting of:

63 parts by wt. of emulsion-polyvinyl chloride (K-40),
32 parts by wt. of dioctylphthalate,
3 parts by wt. of epoxy softener (e.g. "Advaplast 39"),
1.5 parts by wt. of barium-cadmium complex as stabiliser (e.g. "Advastab BC 26") and
0.5 part by wt. of a chelator (e.g. "Advastab CH 300")

are added 0.5 part by weight of pigment according to Example 1, and 5 parts of titanium dioxide (Rutil), and the whole is then intimately mixed. The mixture is rolled,

| Ex. | Diazo component | Coupling component | Shade |
|---|---|---|---|
| 23 | Cl-C6H3(Cl)-NH-CO-C6H3(NH2)-Cl | 2-naphthol-CONH-C6H3(Cl)-N=N-C6H4-Cl | Yellowish red. |
| 24 | (Cl, Cl)-C6H2(Cl)-NH-CO-C6H3(NH2)-Cl | 2-naphthol-CONH-C6H3(Cl)-N=N-C6H4-Cl | Do. |
| 25 | Cl-C6H3(Cl)-NH-CO-C6H3(NH2)-Cl | 2-naphthol-CONH-C6H3(CH3)-N=N-C6H4-CH3 | Red. |
| 26 | (Cl, Cl)-C6H2(Cl)-NH-CO-C6H3(NH2)-Cl | 2-naphthol-CONH-C6H3(CH3)-N=N-C6H4-CH3 | Red. |
| 27 | (Cl, Cl)-C6H2(Cl)-NH-CO-C6H3(NH2)-Cl | 2-naphthol-CONH-naphthyl-N=N-C6H5 | Brown-red. | to obtain better pigment dispersion, for 8 hours on mixing rolls with friction rollers, heated to 160° (one roller rotating at 20 r.p.m., the other at 25 r.p.m.); and thereupon the obtained 0.3 mm. sheet, having a pure red shade, drawn off. The dyeing has very good fastness to light and to migration, as well as resistance to heat.

EXAMPLE 29

4 parts by weight of the pigment according to Example 2 are ground in a ball mill for 24 hours with 96 parts by weight of a mixture of 50 parts by weight of a 60% solution of coconut-oil fatty acid modified alkyd-melamine resin having a 32% fatty acid content, in xylene,
30 parts by weight of a 50% melamine resin solution in butanol,
10 parts by weight of xylene, and
10 parts by weight of ethylene glycol monomethyl ether.

The thereby obtained dispersion is sprayed on to sheet metal; this is then allowed to rest in air for 30 minutes, whereupon the lacquer is stoved for 30 minutes at 120°. A brilliant scarlet red film is obtained having very good fastness to light and to weather.

What we claim is:
1. An asymmetrical disazo compound of the formula

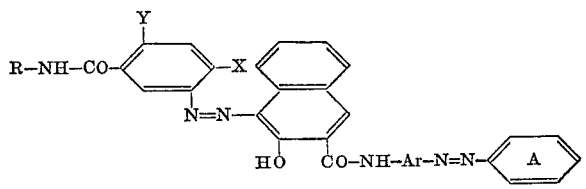

wherein
R represents phenyl or phenyl substituted by chlorine, methyl, methoxy, trifluoromethyl, methoxycarbonyl or acetylamino, or R represents alkyl having 1 to 4 carbon atoms,
X represents chlorine, methyl, phenoxy, or phenoxy monosubstituted by chlorine,
Y represents hydrogen, or also chlorine if X is chlorine, and
Ar represents phenylene, naphthylene or phenylene monosubstituted by chlorine or methyl, and the benzene nucleus A is unsubstituted or monosubstituted by chlorine, or alkyl having 1 to 4 carbon atoms.

2. An asymmetrical disazo compound according to claim 1 wherein Ar represents 1,4-phenylene or 1,4-naphthylene.

3. An asymmetrical disazo compound according to claim 1 wherein R represents phenyl unsubstituted or substituted by 1 to 3 chlorine atoms, methyl or methoxy, Ar represents 1,4-phenylene or 1,4-phenylene substituted by chlorine, X and Y have the meanings given in claim 1, and the benzene nucleus A is unsubstituted or substituted by a chlorine atom.

4. An asymmetrical disazo compound according to claim 1 wherein X represents chlorine.

5. An asymmetrical disazo compound according to claim 4 wherein R represents benzene substituted by 1 to 3 chlorine atoms, and Ar denotes 1,4-phenylene.

6. An asymmetrical disazo compound according to claim 5 wherein R represents 2,4,5-trichlorophenyl, and Y denotes hydrogen.

7. A compound according to claim 1 which is

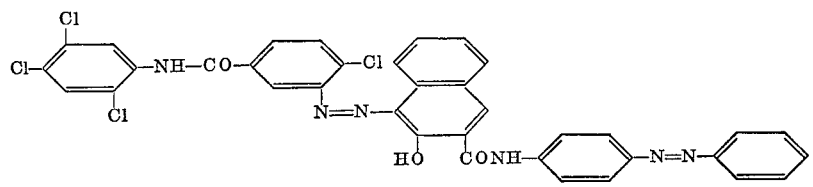

8. A compound according to claim 1 which is

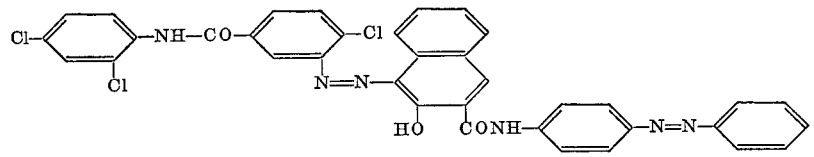

9. A compound according to claim 1 which is

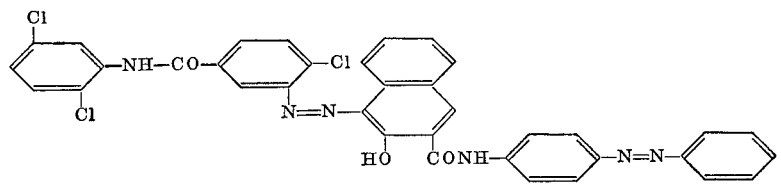

10. A compound according to claim 1 which is

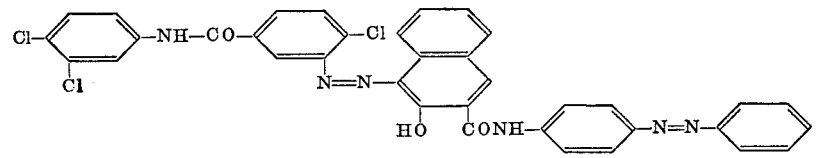

11. A compound according to claim 1 which is
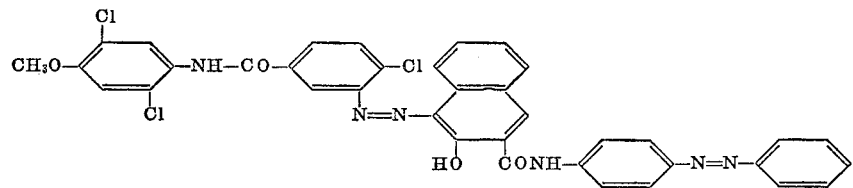
References Cited
UNITED STATES PATENTS
2,163,074  6/1939  Thoma et al. _____ 260—188
LEWIS GOTTS, Primary Examiner
C. F. WARREN, Assistant Examiner
U.S. Cl. X.R.
8—4; 260—174, 178, 184